Figure 1:
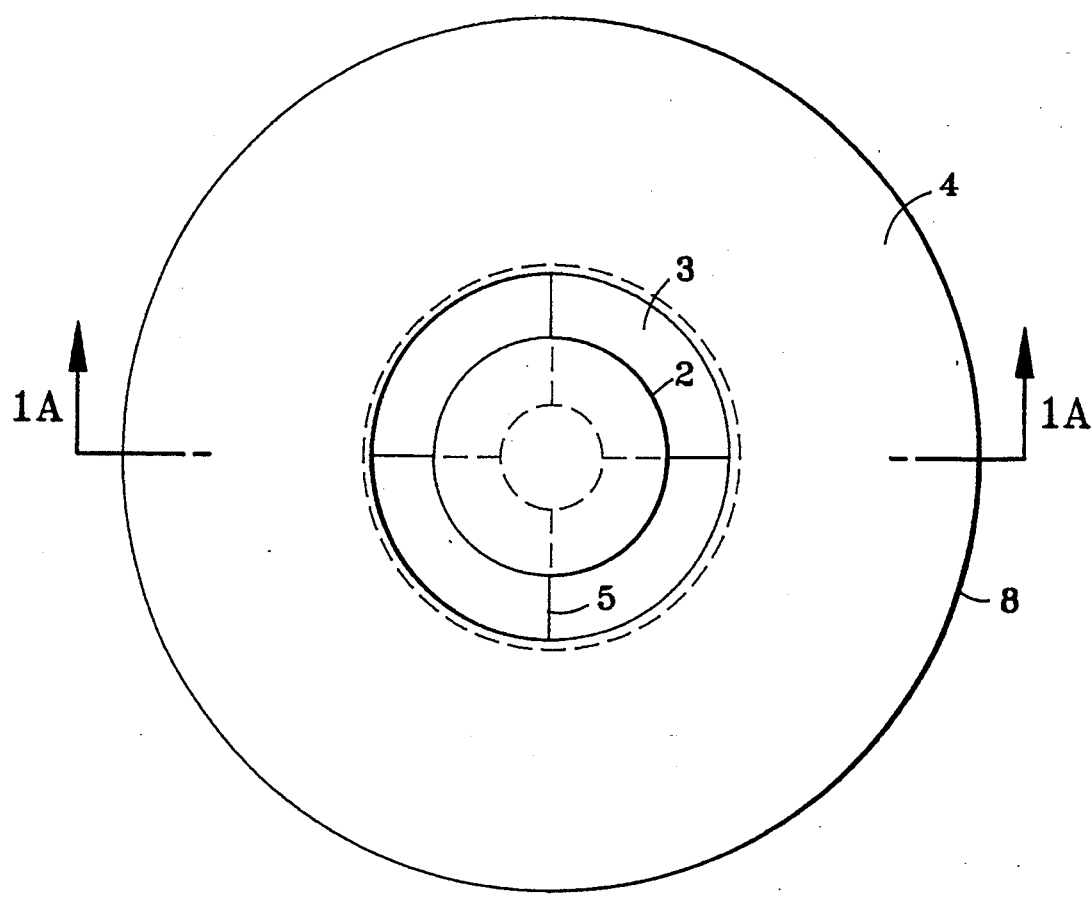

United States Patent [19]

Felder et al.

[11] Patent Number: 5,422,017
[45] Date of Patent: Jun. 6, 1995

[54] APPARATUS FOR CENTRAL CHARGING OF CIRCULAR TANKS WITH SEWAGE WATER

[75] Inventors: Anton Felder, Schlotthauerstrasse 5, D-8000 München 90; Franz Valentin, München, both of Germany

[73] Assignee: Anton Felder, Munich, Germany

[21] Appl. No.: 70,385

[22] PCT Filed: Jul. 14, 1992

[86] PCT No.: PCT/EP92/01596
§ 371 Date: Jun. 8, 1993
§ 102(e) Date: Jun. 8, 1993

[87] PCT Pub. No.: WO93/07949
PCT Pub. Date: Apr. 29, 1993

[30] Foreign Application Priority Data

Oct. 17, 1991 [DE] Germany .................. 41 34 388.3

[51] Int. Cl.⁶ ............................................. B01D 21/26
[52] U.S. Cl. ................................. 210/787; 210/512.1; 210/519; 210/521
[58] Field of Search .................. 210/512.1, 519, 521, 210/787

[56] References Cited

U.S. PATENT DOCUMENTS 2,098,467  11/1937  Sayers et al. .................... 210/519
4,224,157   9/1980  Join .................................. 210/519

Primary Examiner—Robert A. Dawson
Assistant Examiner—David Reifsnyder
Attorney, Agent, or Firm—George W. Dishong

[57] ABSTRACT

The invention relates to an apparatus for central charging of circular tanks with sewage water by means of a vertical pipe and is distinguished by a centrally inserted horizontal circular control disc in the region of the transition from the vertical pipe to a smoothly continuously adjoining bell shaped component or body widening smoothly from a smaller diameter to a larger diameter and having a surface configuration substantially similar to the bell end of a trumpet or similar type of horn. The bell shaped component is attached or connected at the smaller diameter end to an end of the vertical pipe which end is configured to mate with the smaller diameter end of the bell shaped component. The outer periphery of the control disc and the inner surface of the vertical pipe, in the transition region defined to be the region where the bell shaped component connects with an end of the vertical pipe, forms an annular gap.

15 Claims, 4 Drawing Sheets

APPARATUS FOR CENTRAL CHARGING OF CIRCULAR TANKS WITH SEWAGE WATER

The invention relates to an apparatus for central charging of circular tanks with sewage water by means of a vertical pipe.

In the field of sewage technology, in known manner circular settling tanks with considerable diameters are used in communal or municipal sewage works for preliminary sedimentation or as final sedimentation tanks for sludge separation following the activation. Common to these circular tanks is that the inflow takes place in the centre of the circular tank via a pipe leading vertically into the tank. The jet is then deflected by constructions of very varied design into the horizontal in order to achieve as uniform as possible a radially symmetrically flowing into the circular tank. However, all these apparatuses have the disadvantage that firstly they are constructionally very complicated and secondly do not permit a controlled guiding of the radial flow in order for example to compensate possible density differences present due to differences of temperature and solid content between the jet and external flow.

The technological background is that the density of the fluid is changed due to sedimentation of the sludge particles in the tank. The charging takes place via a so-called "central structure". After exit of the fluid from the central structure into the outer space the density differences of the suspension compared with the clear water manifest themselves.

In the radial direction, the geometry of the circular tank produces a pronounced retardation of the stream in the flow direction. Since retarded movements generally react very sensitively to disturbances and there is a tendency to detachment, the careful guiding of the radial flow is of great importance. It should be noted here that the solid-charge stream on flowing out into the outer region is deflected downwardly as a whole due to its higher density (Prof. Valentin, Faculty of Hydraulics and Hydrology, Munich Technical University, Dept. 50, 1988 ISSN 0343-1177).

The invention is based on the problem of providing a constructionally simple apparatus for central charging of circular tanks with sewage water in which the deflection of a vertical jet and a uniform radial symmetrical distribution of the flow is to be achieved. The novel apparatus is also to be able to counteract the fact that solid-charged fluid jets are deflected downwardly due to their higher density on flowing out of the apparatus into the circular tank.

This is surprisingly achieved according to the invention by a centrally inserted horizontal circular control disc in the region of the transition from the vertical pipe to a smoothly continuously adjoining trumpet-like widening, the control disc forming an annular gap with the inner periphery of the vertical pipe. By trumpet-like widening it is understood by those of ordinary skill, particularly in view of the drawing figures that the bell shaped body to which is attached the vertical pipe in somewhat similar in appearance and geometry to the bell end of a horn such as for example a trumpet. The surface geometry of this bell shaped or trumpet-like body is such that an angles formed by tangent lines to the inner facing surface of the bell and the horizontal will go successively from about 90 degrees to about 0 degrees. The tangent lines, starting at the transition region and moving toward the detachment edge of the bell, basically go from axially directed to radially directed.

It is not being overlooked that apparatuses and methods are known which impart a different direction to a gas or liquid jet utilizing the so-called Coanda effect. Not however in sewage technology.

As is known, in these central structure the density at the entrance is greater than the density thereafter. However, due to the higher density the flow moves downwardly and swirls the deposited sludge up again. In practice, instead of the required 80% an efficiency of only 60% was achievable. Here, the step according to the invention represents a surprising step forwards.

The advantages achieved with the invention reside in particular therein that the deflection and guiding of the jet after the discharge takes place via the annular gap at the edge of the trumpet-like or toroid body utilizing the Coanda effect and is therefore exactly predictable. The exit velocity over the entire periphery of the annular gap is constant and depends only on the static pressure. Furthermore, the widening of the jet due to the turbulent mixing in of the outer flow, the desired drop in the jet velocity and the detachment criterion at the edge of the trumpet-like or toroid body are predictable.

Trumpet-like means an annular body which for example curves from the pure vertical in continuous transition into the horizontal or almost into the horizontal. By Coanda effect, according to the definition, the following is understood: the characteristic or capability of free-fluid-flows having small cross-sections to lay itself or apply itself to vicinal body surfaces and also to follow severe alterations of directions of the surface structure without any peeling off (i.e., without separating from that surface).

According to an advantageous embodiment of the invention, by varying the deflection angle $\beta$ of the trumpet-like or toroid body the direction of the jet flowing into the circular tank can be specifically influenced because the detachment point is exactly defined. An obvious method of varying the deflection angle $\beta$ would be to make the bell shaped body replaceable by providing for the removeable attachment of the bell shaped body to the output end of the vertical pipe, i.e., athe the region of transition which is where the control disc is substantially located. The bell shaped body would connect to a mateable edge providing for a smooth and continuous transition from vertical to almost horizontal. There may be provided a variety of bell shaped bodies, i.e., trumpet-like bodies, each of which would have a different geometry such that the deflection angle $\beta$ is thereby different. The flow at the edge of the trumpet-like body may thus be directed from nearly vertical to substantially horizontal. This therein makes it possible to compensate density differences which are present due to the differences of temperature and solid content between the jet and the outer flow. With a corresponding back-up pressure and a corresponding ratio of the toroid radius or the radius R of the trumpet-like body to the annular gap width, at the edge of the trumpet-like body deflections of up to 180° can be achieved.

It is important that the apparatus according to the invention expediently makes it possible to vary the exit area of the annular gap by replacing the control discs. It is thus possible to perform subsequent adaptations to operation changes in simple manner. An expedient further development is set forth in further subsidiary claims. Conveniently, as fitting a lamella ring arrangement is provided over the entire periphery of the trumpet-like body at equal intervals and at a specific angle to the inflow direction. This is a particularly simple and reliable manner to impart to the jet a tangential component in addition to the radial component. This primarily lengthens the flow path in the circular tank and this in turn leads in sedimentation tanks to an improved sedimentation and to the so-called tea-cup effect.

In addition, in the embodiment with the lamella fitting by uniform turning of all the lamellae through a predetermined angle to the inflow direction the magnitude of the tangential component can also be influenced.

In a further development of the invention the apparatus may be turned through 180° about its horizontal axis. This is done in particular when for example for operational requirements the supply conduit is introduced vertically from above instead of from below into the circular tank.

The subject of the invention is also a method for charging circular tanks. This method is distinguished in that the Coanda effect is utilized for deflecting and guiding the vertical charging jet into the horizontal and for obtaining a radially symmetrical distribution.

According to a particular further development of the invention the apparatus can also be operated turned through 180°.

Figure 1A:
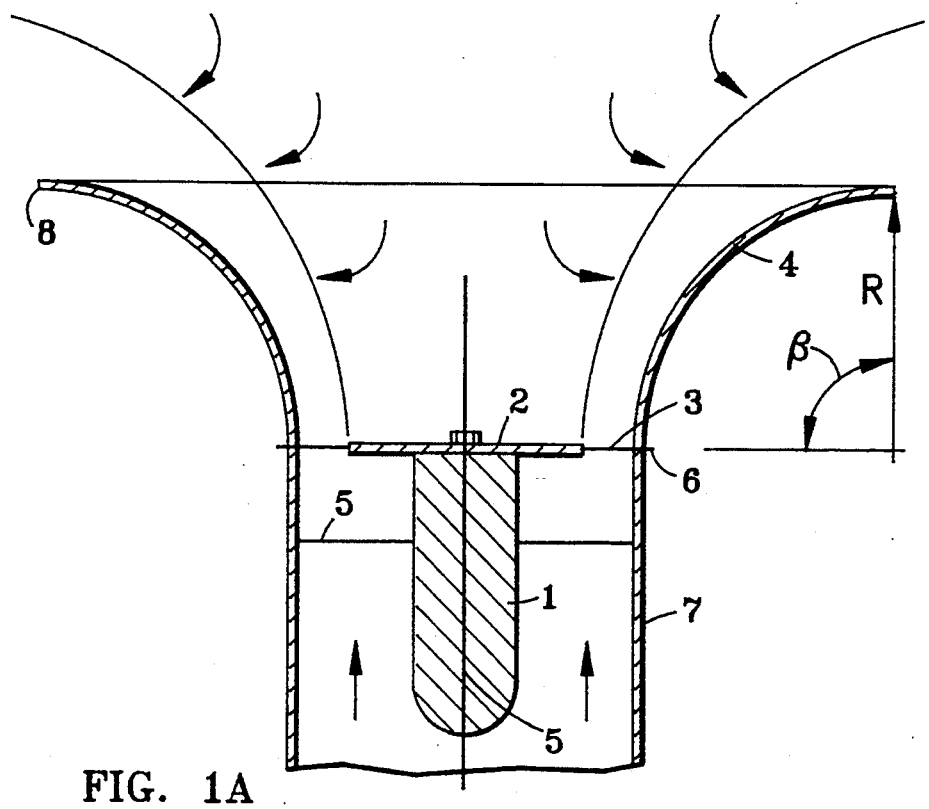
Figure 2:
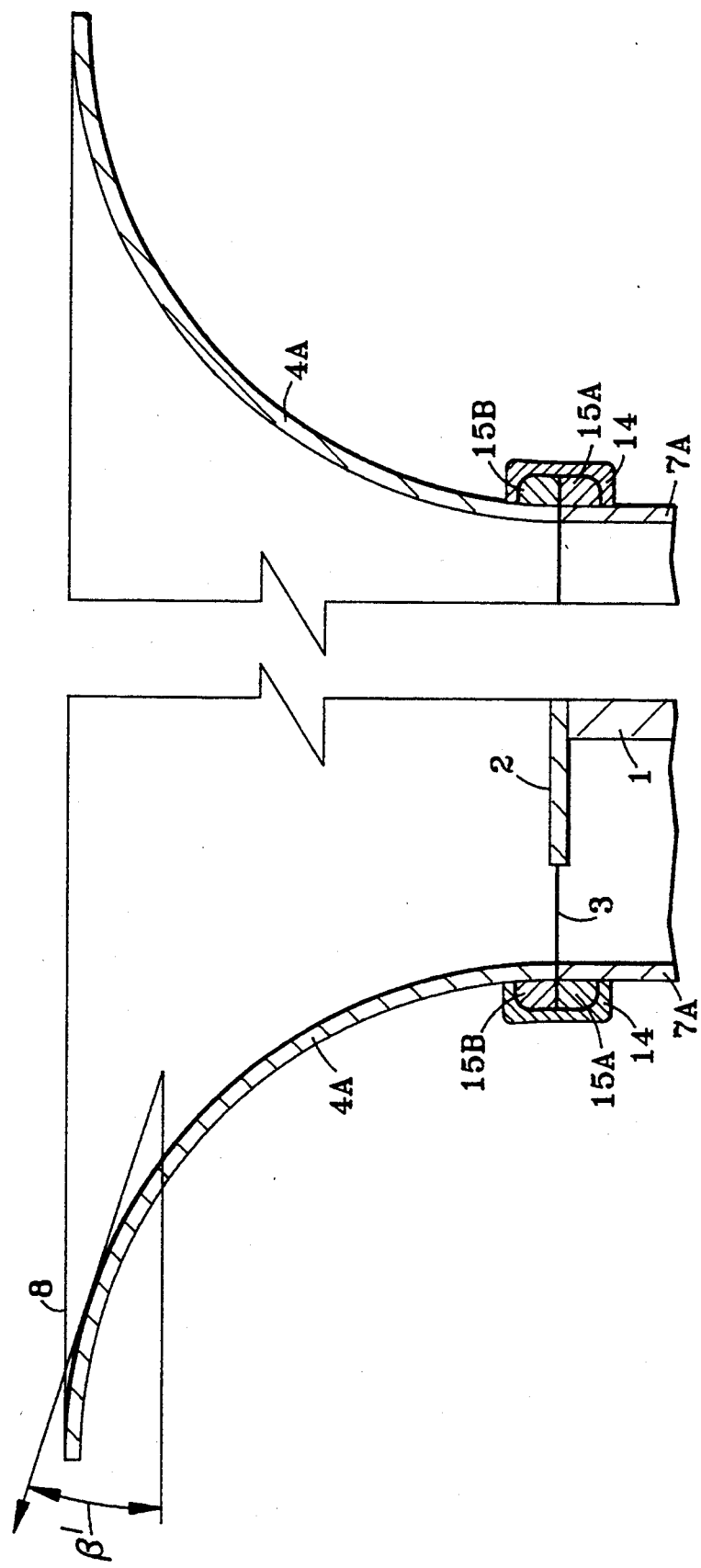

Examples of embodiment of the invention will now be described in detail with the aid of the attached drawings, wherein:

FIG. 1 is a plan view of a first embodiment,
FIG. 1A is a sectioned side elevation of FIG. 1;
FIG. 2 is a sectioned side elevation of the first embodiment but modified with flanges and clamps to provide for changing of the bell shaped body;
FIGS. 3 to 6 show possible variations and amplifications of the embodiment shown in FIG. 1.

In the embodiment of the invention illustrated in FIGS. 1 and 1A a trumpet-like or toroid body 4 is provided, referred to hereinafter as trumpet-like body. To form the annular gap 3 a circular control disc 2 is mounted at the level of the flange 6 and the diameter thereof must be smaller than the internal diameter of the vertical pipe 2. The control disc 2 is secured on a solid cylinder 1 disposed centrally in the vertical pipe 7 and also acting as jet splitter when subjected to the flow as indicated by the direction of the arrow. The solid cylinder 1 is in turn secured via four centering rods 5 to the vertical pipe 7. A curvator effect arises. Jet detachment occurs automatically at a deflection of about 85°.

FIG. 2 illustrates a relatively simple, easy and clearly obvious means for making deflection angle $\beta$ variable. Vertical pipe 7A having a flange 15A thereon, is otherwise similar to vertical pipe 7. Trumpet-like body 4A having flange 15B thereon, is otherwise similar to trumpet-like body 4. Flanges 15A and 15B are mateable and clamp 14 secures trumpet-like body 4A to vertical pipe 7A. Deflection angle $\beta'$ is similar to, in function to deflection angle $\beta$ but of different magnitude. An assortment of trumpet-like bodies each having different deflection angles $\beta$, $\beta'$, $\beta''$, for example, could be provided in order that deflection angle $\beta$ may be made variable.

Figure 3:
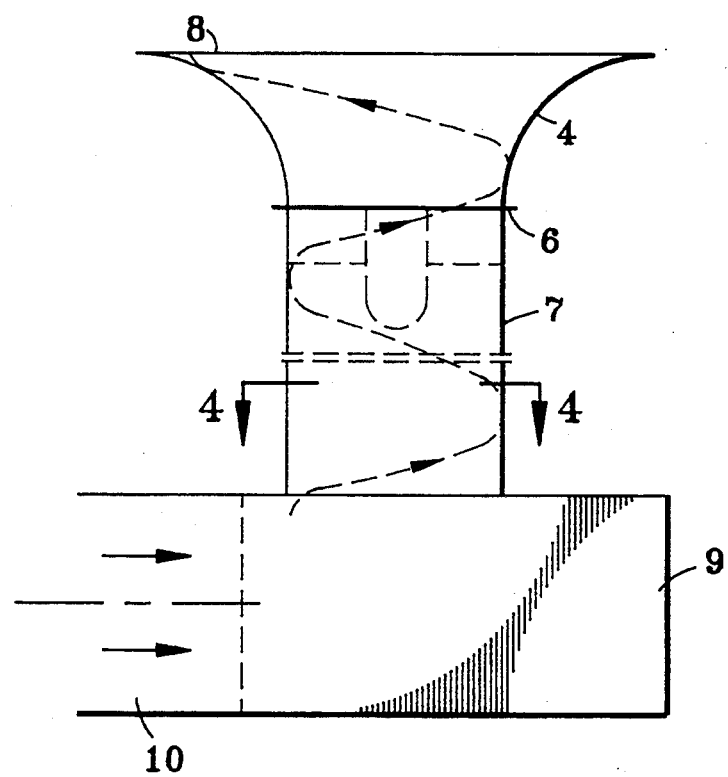
Figure 4:
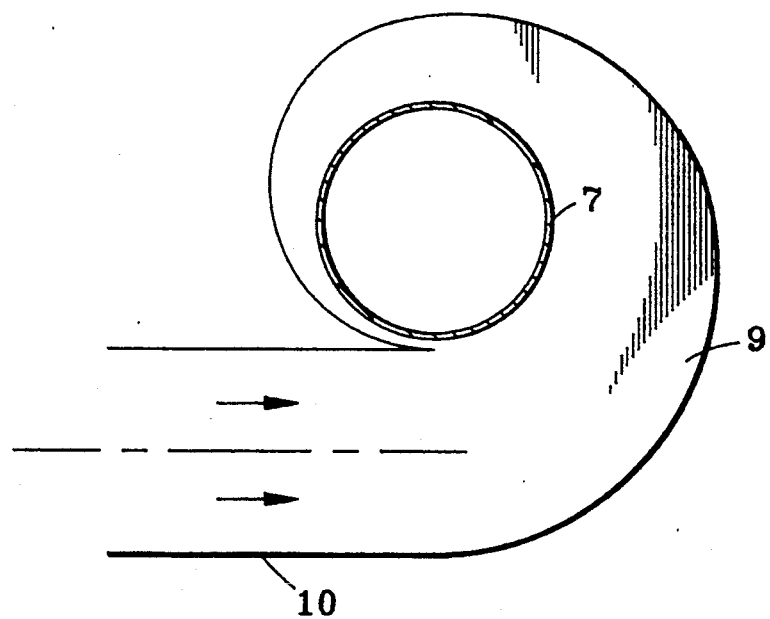

FIGS. 3 and 4 show an embodiment in conjunction with a twist chamber 9. Via the horizontal pipe 10, as shown by the arrow direction the sewage water is introduced into the twist or spin chamber 9. The spiral flow thus generated leaves the twist chamber 9 via the vertical pipe 7. The spiral motion of the flow is retained also after exit via the annular gap 3 and as a result, after the deflection of the vertical flow at the edge of the trumpet-like body 4, produces a tangential component in addition to the radial component. A spiral flow arises and the path is increased, the flow rate however being very greatly reduced, for example from 1 m/sec. to about 10 cm/sec. The provision of the twist chamber compensates the distortion of the pipe flow by the velocity profile.

Figure 5:
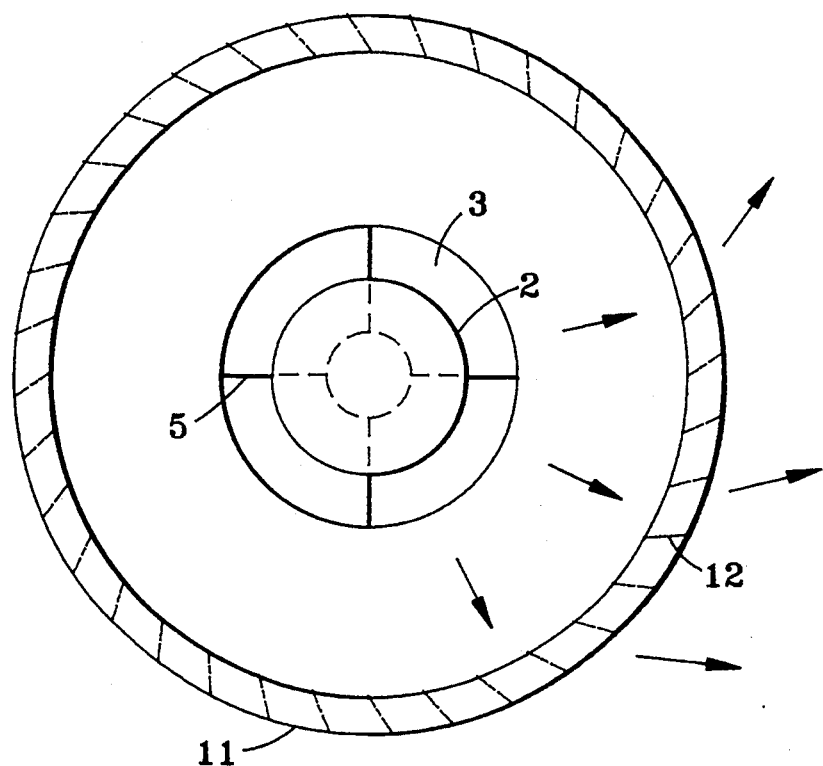
Figure 6:
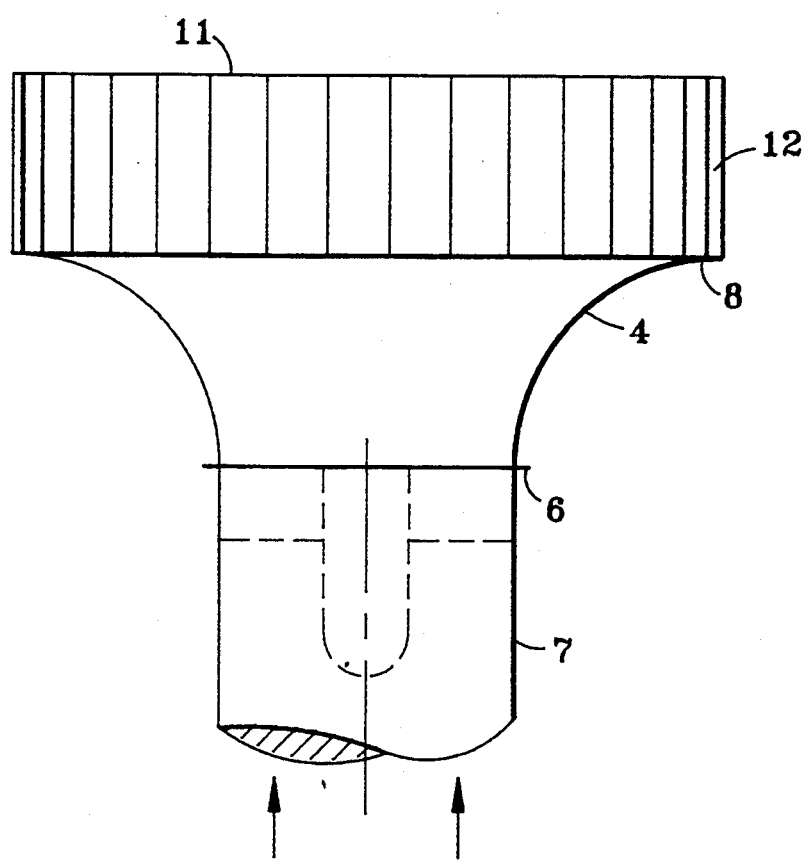

FIGS. 5 and 6 show in a modified embodiment a fitting 11; 12 on the trumpet-like or toroid body. The latter is provided with such lamellae 12 at the detachment edge 8 at the location where the flow detaches from the edge of the trumpet-like body 4. The lamellae 12 are distributed at equally sized intervals round the detachment edge 8 of the trumpet-like body 4 and are held at the top by a ring 11 and at the bottom by means secured to the detachment edge 8 of the trumpet-like body 4. As a result a tangential component is imparted to the jet in addition to the radial component. The consequence is that the flow path in the circular tank is lengthened. This in turn results in improved sedimentation and leads to the so-called tea-cup effect. The lamellae 12 may be uniformly turned to the attack direction, for example through a predetermined angle, thereby also enabling the magnitude of the tangential component to be influenced.

With regard to the definition of the toroid it should be added that the latter can be considered as a rotation body comprising a convexly curved continuous space curve, "trumpet-like" representing a simplified definition.

We claim:

1. Apparatus for central charging of circular tanks with sewage water by utilization of the Coanda effect, comprising:
   a vertical pipe having an axis substantially vertically directed;
   a bell shaped body configured similarly to a bell end of a trumpet and having a small diameter end and a fluid detachment end, said small diameter end connected to and adjoining at one end of said vertical pipe defining thereby a smooth and continuous region of transition from said vertical pipe to said bell shaped body;
   a substantially circular control disc substantially centrally and horizontally inserted in said region of transition, centrally positioned and horizontal relative to said vertical pipe; and
   an outer peripheral edge of said control disc and an inner periphery surface of said vertical pipe defining an annular gap in said region of transition, said annular gap and said bell shaped body cooperating in such a manner that causes hydraulic deflection of a vertical jet creating thereby a substantially horizontally symmetrical distribution of said sewage water using the Coanda effect.

2. Apparatus according to claim 1, wherein said bell shaped body widens in a manner such that axially directed tangent lines to an inner surface of said bell shaped body smoothly change from vertical at said annular gap toward horizontal substantially at said fluid detachment end of said bell shaped body and which is connected at said region of transition to a mateable edge at said one end of said vertical pipe.

3. Apparatus according to claim 2, wherein said bell shaped body is removeably and replaceably connectable to said said vertical pipe and said bell shaped body, being selected from a plurality of bell shaped bodies each having a different configuration defining a predetermined and defined deflection angle ($\beta$) from between about 0° and 90° of said bell shaped body, said deflection angle defined substantially by direction relative to the horizontal of said axially directed tangent lines substantially at said fluid detachment end of said bell shaped body.

4. Apparatus according to claim 3, further comprising means for replacing said control disc with another control disc having a predetermined size and geometric shape thereby defining a selectable geometry for said annular gap.

5. Apparatus according to claim 4, further comprising a plurality of attachable lamellae arranged in annular array at substantially equal intervals over said fluid detachment end of said bell shaped body, each said lamellae surface substantially vertical and angled a predetermined amount from direction of radii of said bell shaped body.

6. Apparatus according to claim 4, further comprising a twist chamber having a spiral passage therethrough and attached in flow communication with another end of said vertical pipe.

7. Apparatus according to claim 3, further comprising a plurality of attachable lamellae arranged in annular array at substantially equal intervals over said fluid detachment end of said bell shaped body, each said lamellae surface substantially vertical and angled a predetermined amount from direction radii of said bell shaped body.

8. Apparatus according to claim 2, further comprising means for replacing said control disc with another control disc having a predetermined size and geometric shape thereby defining a selectable geometry for said annular gap.

9. Apparatus according to claim 3, further comprising a twist chamber having a spiral passage therethrough and attached in flow communication with another end of said vertical pipe.

10. Apparatus according to claim 2, further comprising a plurality of attachable lamellae arranged in annular array at substantially equal intervals over said fluid detachment end of said bell shaped body, each said lamellae surface substantially vertical and angled a predetermined amount from direction radii of said bell shaped body.

11. Apparatus according to claim 2, further comprising a twist chamber having a spiral passage therethrough and attached in flow communication with another end of said vertical pipe.

12. Apparatus according to claim 1, wherein said bell shaped body is removeably and replaceably connectable to said said vertical pipe and said bell shaped body, being selected from a plurality of bell shaped bodies each having a different configuration defining a predetermined and defined deflection angle ($\beta$) from between about 0° and 90° of said bell shaped body, said deflection angle defined substantially by direction relative to the horizontal of axially directed tangent lines to an inner surface of said bell shaped body substantially at said fluid detachment end of said bell shaped body.

13. Apparatus according to claim 1, further comprising a twist chamber having a spiral passage therethrough and attached in flow communication with another end of said vertical pipe.

14. Method for central charging of a circular tank with sewage water in vertical entrance flow, comprising the steps of:
introducing into said vertical entrance a vertical charge jet of said sewage water;
splitting said charge jet axially;
causing said split vertical charge jet to flow through an annular gap at a transition region located at output of said vertical flow entrance and input of a bell shaped body configured similarly to a bell end of a trumpet and having a small diameter end and a fluid detachment end, said annular gap of specific and selectable cross section and said annular gap created by an outer peripheral edge of a substantially circular disc and an inner periphery surface of said vertical entrance; and
providing a bell shaped peripheral surface in flow contact with said charge jet emerging from said annular gap thereby creating conditions for utilizing the Coanda effect for hydraulically deflecting and guiding said vertical charge jet into substantially a horizontal direction and producing thereby a radially symmetrical distribution of said sewage water into said circular tank.

15. The method for central charging of a circular tank with sewage water in vertical entrance flow according to claim 14 further comprising the steps of:
imparting to said charge jet a tangential flow component, said tangential flow component being additional to a radial flow component upon entry of said sewage water into said circular tanks.

* * * * *